Nov. 26, 1963  J. C. MILLER  3,112,130
COUPLING BETWEEN HELMET AND PRESSURE SUIT
Filed Oct. 20, 1960  3 Sheets-Sheet 1

INVENTOR.
JOHN C. MILLER
BY
Brown, Critchlow, Flick & Peckham
ATTORNEYS

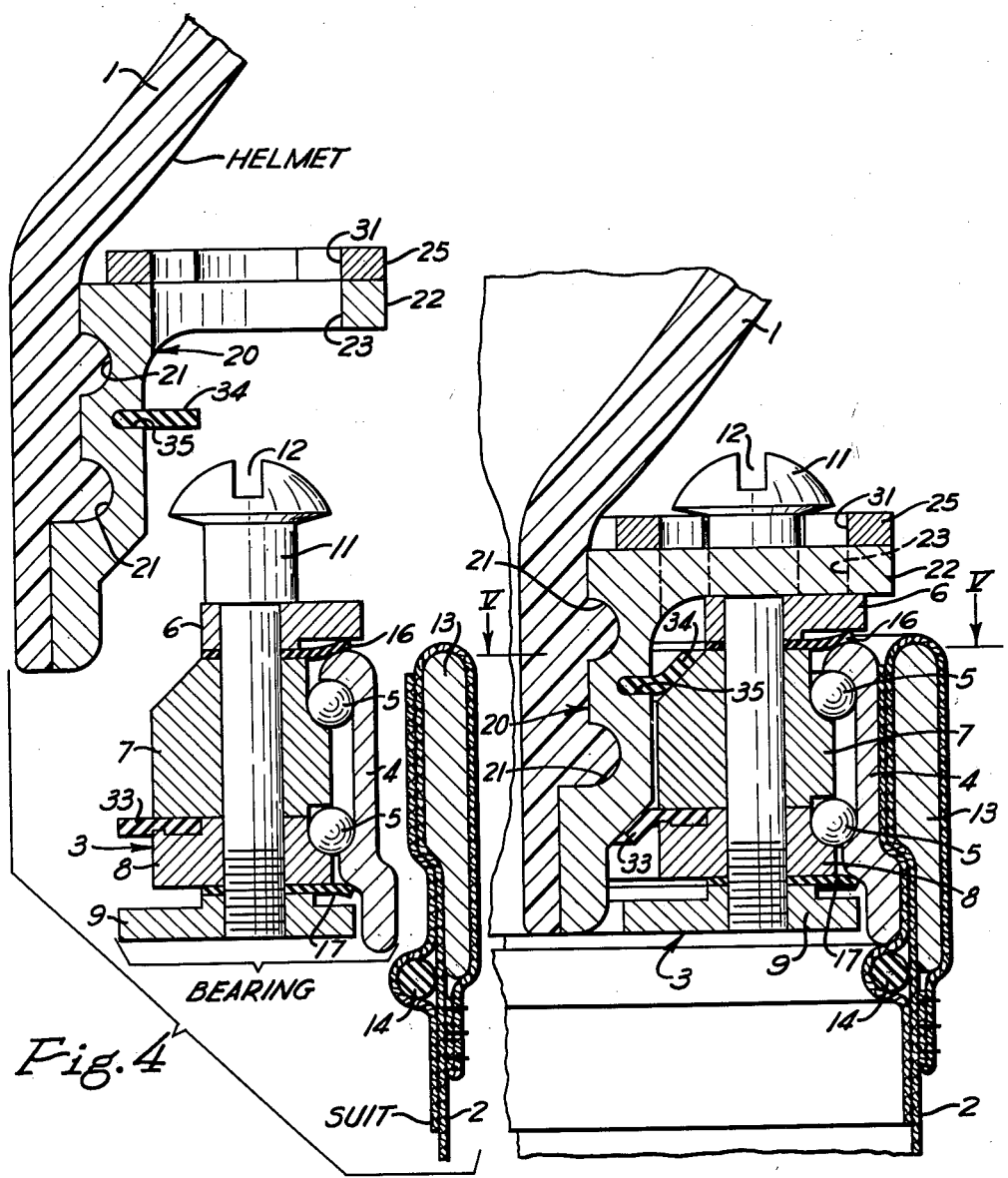

Nov. 26, 1963  J. C. MILLER  3,112,130
COUPLING BETWEEN HELMET AND PRESSURE SUIT
Filed Oct. 20, 1960  3 Sheets-Sheet 3

INVENTOR.
JOHN C. MILLER
BY
Brown, Critchlow, Flick & Peckham
ATTORNEYS

United States Patent Office 3,112,130
Patented Nov. 26, 1963

3,112,130
COUPLING BETWEEN HELMET AND
PRESSURE SUIT
John C. Miller, Anaheim, Calif., assignor to Mine Safety
Appliances Company, a corporation of Pennsylvania
Filed Oct. 20, 1960, Ser. No. 63,809
11 Claims. (Cl. 285—276)

This invention relates to pressurized suits such as worn by aviators at high altitudes, and more particularly to airtight couplings for rotatably connecting helmets to such suits.

With a pressurized suit the air pressure inside of it develops an upward thrust against the helmet, which is proportional to the pressure differential between helmet interior and the outside atmosphere, and the projected area of the opening in the bottom of the helmet that receives the head. The smaller the area of the helmet opening, the less the upward thrust. Since the head is longer than it is wide and therefore can be passed through an elliptical opening having an area substantially less than that of a circular opening large enough to receive the head, the use of an elliptical opening can reduce the upward thrust of the helmet materially. However, it is customary to detachably connect a helmet to the neck of a pressure suit by a coupling containing a bearing that will permit the helmet to be turned by the head relative to the suit. It will be seen that a circular bearing and an elliptical coupling are incompatible, so heretofore the coupling has had to be circular.

It is among the objects of this invention to provide a neck coupling for a helmet and pressure suit which is elliptical and yet which includes a bearing that permits the helmet to be turned relative to the suit.

In accordance with this invention the coupling comprises a bearing having concentric inner and outer elliptical rings. Preferably, there are ball bearings between the two elliptical rings. The space between the rings is made airtight. Means are provided for connecting one of the rings to the neck of a pressure suit and the other ring to the bottom of a helmet. One of the rings is rigid and the other is flexible so that they can be rotated relative to each other. As the helmet is turned, the flexible ring will conform in shape to the rigid elliptical ring.

The preferred embodiment of the invention is illustrated in the accompanying drawings, in which—

FIG. 3 is a further enlarged vertical section through the coupling, showing fragments of the attached helmet and suit;

FIG. 4 is an exploded view of the parts shown in FIG. 3; and

Figure 1:
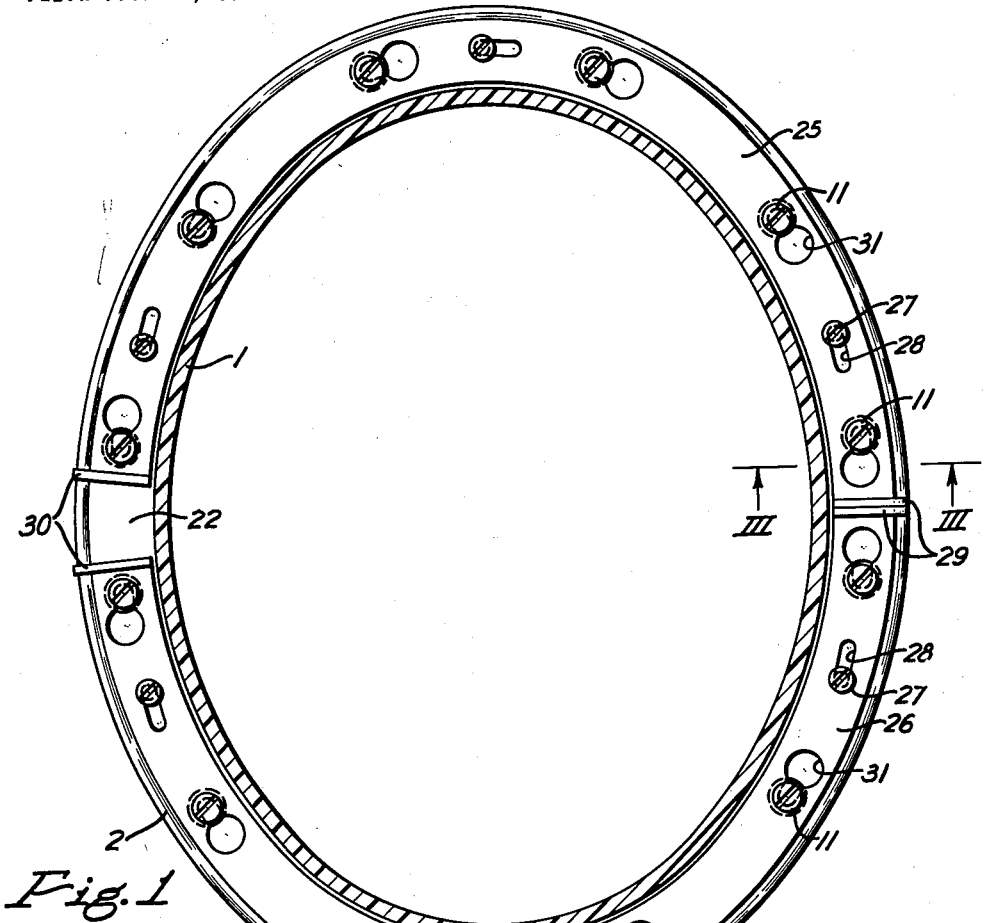
FIG. 1 is a horizontal section through the lower part of a helmet, showing the elliptical coupling in plan.
Figure 2:
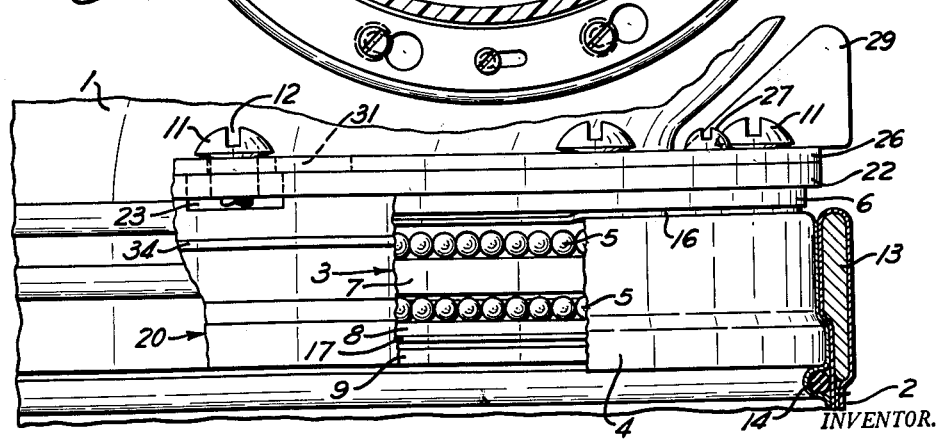
FIG. 2 is an enlarged fragmentary side view of the coupling, with the neck of the suit and parts of the coupling broken away.

Referring to the drawings, the bottom of a helmet 1 is detachably connected to the neck of a pressure suit 2 by means of a coupling formed from a separable bearing and connecting ring. One of these members, preferably the bearing, is secured tightly to the suit and the other member is connected to the helmet. The bearing includes two relatively rotatable concentric rings 3 and 4 which, for best results, serve as races for ball bearings 5 between them. One ring 3, usually the inner one, is formed from a stack of ring elements 6, 7, 8 and 9 that are clamped together by a number of laterally spaced studs 11 extending down through them and screwed into the bottom element. Each stud has an enlarged upper end projecting above the top ring element and pressing down against it. The head of the stud is still larger and has a kerf 12 for receiving a screwdriver to tighten the stud in place.

As shown in FIGS. 3 and 4, the inside of ring 4 that forms the outer race is provided with a wide groove for receiving the two rows of ball bearings. The lower portion of this ring is offset outwardly to fit beneath a shoulder on a collar ring 13 that is sewed into the neck of the suit and surrounds the bearing. A heavy cord 14 sewed into the suit directly beneath the ring 4 prevents vertical movement between that ring and the collar ring, so the bearing becomes a part of the suit. The material of the suit seals the space between rings 4 and 13. The space between the two races is sealed to make it substantially airtight by means of vertically spaced flexible gaskets clamped between the ring elements of the inner race. The upper gasket 16, projecting from between upper elements 6 and 7, frictionally engages the top of the outer race, while the lower gasket 17 is clamped between the lower elements 8 and 9 and engages the outer race below balls 5.

To fasten the connecting ring 20 of the coupling to the helmet, the inner surface of the ring may be provided with annular grooves 21, into which the lower part of the helmet is molded and thereby sealed. This ring has an outwardly projecting upper flange 22 that overlies the bearing and rests on top of it when the two parts of the coupling are assembled. In order to attach the connecting ring to the bearing, flange 22 is provided with circumferentially spaced openings 23 large enough to receive the heads of studs 11, which will project above the flange. The studs can be locked in the connecting ring by means of arcuate slides 25 and 26 mounted on top of the flange by means of screws 27 that extend down through slots 28 in the slides and into the underlying ring, as shown in FIG. 1. The two slides are short enough to permit them to be moved a short distance in opposite directions simultaneously. For this purpose, their ends are provided with upwardly turned lugs 29 and 30 that permit them to be drawn together at one side or the other of the coupling. The studs 11 extend up through keyhole slots 31 in the slides, the larger end of each slot being big enough to receive the head of a stud, and the narrow end of the slot being only wide enough to receive the portion of the stud directly beneath its head. The narrow ends of the keyhole slots in one locking slide point in one direction, and in the other slide they point in the opposite direction. Therefore, to lock the studs in the connecting ring, the locking slides are pulled in the direction around the helmet that will move the narrow portions of the keyhole slots beneath the heads of the studs. As shown in FIG. 1, this is done by pulling lugs 29 together, whereby the two main parts of the coupling are locked together. To permit the coupling to be separated, lugs 30 are simply pinched together to release the slides from the studs, and then the helmet and attached connecting ring can be lifted off the bearing.

The space between the bearing and connecting ring 20 may be sealed by a pair of vertically spaced gaskets. As shown in FIGS. 3 and 4, the lower gasket 33 is clamped between the two middle elements 7 and 8 of the inner race and engages the lower part of the connecting ring. The upper gasket 34 is tightly mounted in a groove 35 around the outside of the connecting ring and engages the upper part of the bearing.

Figure 5:
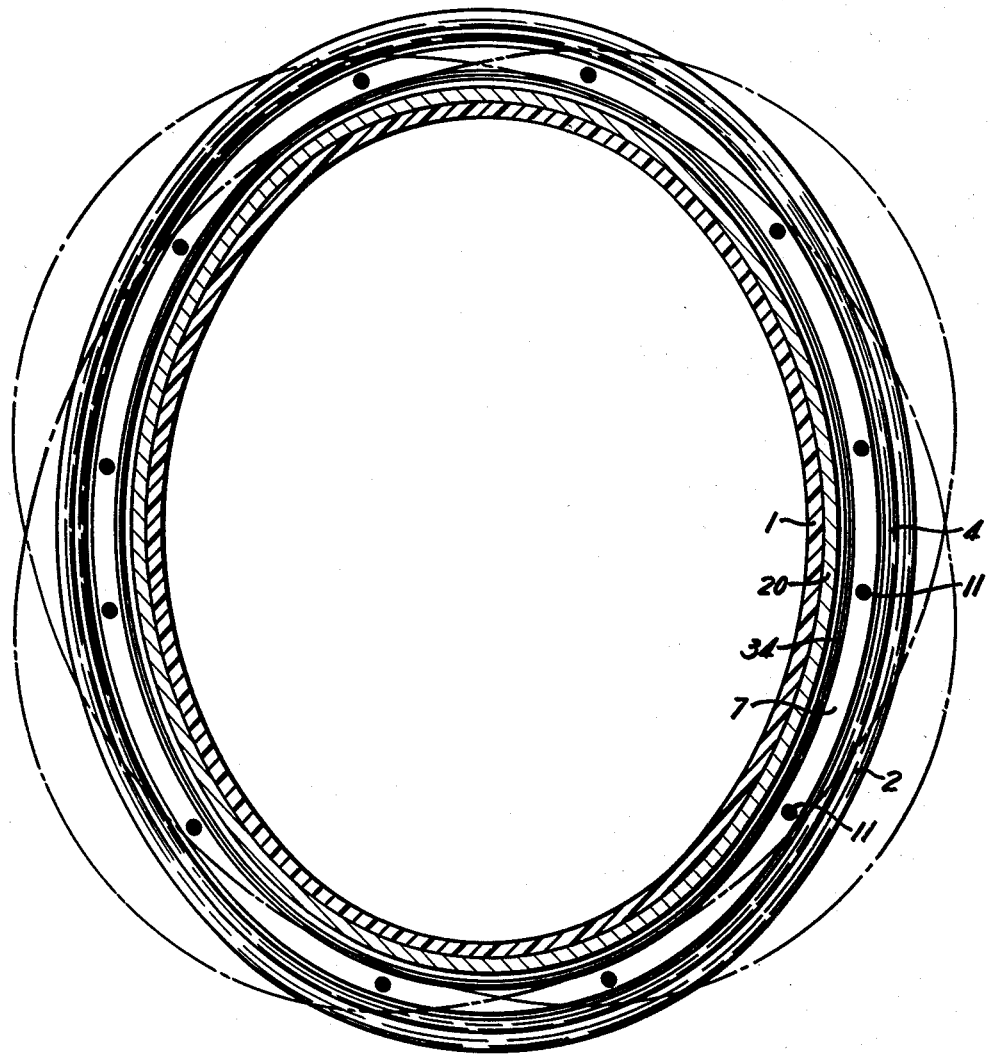
FIG. 5 is a horizontal section of the coupling and helmet taken on the line V—V of FIG. 3 and indicating by broken lines different positions of the coupling as the helmet is turned relative to the suit.

It is a feature of this invention that the coupling is elliptical to fit around a helmet having an elliptical opening in its bottom, and that in spite of that the inner race 3 of the bearing can be turned in the outer race 4. To make this possible, the inner ring of the bearing is made rigid as well as elliptical, but the outer bearing ring and the collar ring 13 are thin enough to be flexible. The two flexible rings may be made circular originally, but they will take an elliptical shape when applied to the inner race of the bearing. Of course, the connecting ring 20 likewise is elliptical to fit around the elliptical opening in the bottom of the helmet and to fit inside the elliptical bearing. When the aviator turns his head, the helmet will be able to turn easily with it because the outer bearing ring 4 and the collar ring will flex and allow the inner ring 3 to turn within them, as indicated in broken lines in FIG. 5. Consequently, the coupling bearing, although elliptical, permits the helmet to be turned freely relative to the pressure suit.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. An annular airtight coupling for connecting a helmet to the neck of a pressure suit, the couplping comprising a bearing having concentric relatively rotatable inner and outer elliptical rings separated by bearing surfaces, means sealing the space between the rings, means permanently holding said rings and sealing means together, means for connecting one of the rings to the neck of a pressure suit, and means for connecting the other ring to the bottom of a helmet to permit the helmet to be swung from side to side, one of the rings being rigid and the other ring being flexible, whereby said last-mentioned means can turn the adjoining ring on its axis relative to the other ring.

2. An annular airtight coupling according to claim 1, in which said sealing means comprises a flexible elliptical gasket secured to the rigid ring and slidably engaging the flexible ring.

3. An annular airtight coupling for connecting a helmet to the neck of a pressure suit, the coupling comprising a bearing having concentric relatively rotatable inner and outer elliptical rings separated by bearing surfaces, means sealing the space between the rings, means permanently holding said rings and sealing means together, means for connecting one of the rings to the bottom of a helmet, and means for connecting the other ring to the neck of a pressure suit, said one ring being rigid and the other ring being flexible, whereby said first-mentioned connecting means can turn the rigid ring on its axis relative to the flexible ring to permit the helmet to be swung from side to side.

4. An annular airtight coupling according to claim 3, in which said last-mentioned connecting means is a flexible ring.

5. An annular airtight coupling for connecting a helmet to the neck of a pressure suit, the coupling comprising a ball bearing having inner and outer elliptical race rings separated by balls, a flexible elliptical sealing gasket secured to the inner ring and slidably engaging the outer ring below said balls, means for connecting the inner ring to the bottom of a helmet, and a flexible ring encircling said outer ring for connecting the neck of a pressure suit to the outer ring to permit the helmet to be swung from side to side, the inner ring being rigid and the outer ring being flexible, whereby said connecting means can turn the rigid inner ring in the flexible outer ring.

6. An annular airtight coupling for connecting a helmet to the neck of a pressure suit, the coupling comprising a ball bearing having inner and outer elliptical race rings separated by balls, a flexible elliptical sealing gasket secured to the inner ring and slidably engaging the outer ring below said balls, means detachably connected with the inner ring for connecting it to the bottom of a helmet, and means for connecting the flexible ring to the neck of a pressure suit to permit the helmet to be swung from side to side, the inner ring being rigid and the outer ring being flexible, whereby said first-mentioned means can turn the rigid inner ring in the flexible outer ring.

7. An annular airtight coupling according to claim 6, in which said first-mentioned connecting means includes a ring, and a flexible elliptical sealing gasket is secured to said inner ring and slidably engages said connecting ring.

8. An annular airtight coupling for connecting a helmet to the neck of a pressure suit, the coupling comprising a ball bearing having inner and outer elliptical rings separated by balls, a flexible elliptical sealing gasket secured to one of the rings and slidably engaging the other ring below said balls, a connecting ring adapted to be secured to the bottom of a helmet and extending outward over said inner ring in engagement therewith, the connecting ring being provided with circumferentially spaced vertical openings therethrough, studs mounted in said inner ring and extending up through said openings and having heads at their upper ends, means on the connecting ring for removably engaging said heads to lock the connecting ring and inner ring together, and a flexible ring encircling said outer ring for connecting the neck of a pressure suit to the outer ring, the inner ring being rigid and the outer ring being flexible, whereby said connecting ring can turn the rigid inner ring in the flexible outer ring to permit the helmet to be swung from side to side.

9. An annular coupling for rotatably connecting a helmet to the neck of a pressure suit, the coupling comprising a bearing having concentric inner and outer relatively rotatable rings, means for connecting the outer ring to the neck of a pressure suit, a connecting ring adapted to be secured to the bottom of a helmet and extending outward over said bearing in engagement therewith, the connecting ring being provided with circumferentially spaced vertical openings therethrough, a locking member mounted on said connecting ring and slidable circumferentially thereof, said member being provided with keyhole slots having narrow ends overlying said ring openings, studs mounted in said inner ring and extending up through said openings and slots and having heads engaging the top of the locking member, the ring openings and the wide ends of the keyhole slots being larger than the stud heads, and means for sliding the locking member along the connecting ring to move the wide ends of said slots beneath the stud heads, whereby the connecting ring can be lifted off the bearing.

10. An annular coupling for rotatably connecting a helmet to the neck of a pressure suit, the coupling comprising a bearing having concentric inner and outer relatively rotatable rings, means for connecting the outer ring to the neck of a pressure suit, a connecting ring adapted to be secured to the bottom of a helmet and extending outward over the bearing in engagement therewith, said connecting ring being provided with circumferentially spaced vertical openings therethrough, a pair of arcuate locking members mounted on said connecting ring and slidable circumferentially thereof, the ends of said members at one side of the connecting ring being closer together than at the opposite side of that ring, the locking members being provided with keyhole slots having narrow ends overlying said ring openings, studs mounted in said inner ring and extending up through said openings and slots and having heads engaging the tops of the locking members, the ring openings and the wide ends of the keyhole slots being larger than the stud heads, the narrow ends of the slots in the locking members pointing away from said closer ends, and means for sliding the locking members around the connecting ring in opposite directions simultaneously to move the wide ends of said slots beneath the stud heads, whereby the connecting ring can be lifted off the bearing.

11. An annular coupling according to claim 10, in which said connecting ring is elliptical and said locking members are segments of an ellipse.

References Cited in the file of this patent

UNITED STATES PATENTS

| | | |
|---|---|---|
| 484,885 | Stove | Oct. 25, 1892 |
| 1,349,060 | Gall et al. | Aug. 10, 1920 |
| 1,978,707 | Gibbons | Oct. 30, 1934 |
| 2,421,533 | Ackerman et al. | June 3, 1947 |
| 2,906,143 | Musser | Sept. 29, 1959 |
| 2,966,808 | Grudin | Jan. 3, 1961 |